United States Patent [19]

Tokiwa et al.

[11] Patent Number: 5,124,371
[45] Date of Patent: Jun. 23, 1992

[54] BIODEGRADABLE PLASTIC COMPOSITION, BIODEGRADABLE PLASTIC SHAPED BODY AND METHOD OF PRODUCING SAME

[75] Inventors: Yutaka Tokiwa, Tsuchiura; Akira Iwamoto; Kiyoshi Takeda, both of Tsukuba, all of Japan

[73] Assignees: Director-General of Agency of Industrial Science and Technology; JSP Corporation, both of Japan

[21] Appl. No.: 611,558

[22] Filed: Nov. 13, 1990

[30] Foreign Application Priority Data

Nov. 14, 1989 [JP] Japan .................................. 1-295765

[51] Int. Cl.⁵ .............................................. C08L 67/04
[52] U.S. Cl. ...................................... 523/124; 523/125; 525/411; 525/415; 525/450
[58] Field of Search ................ 523/124, 125; 525/411, 525/415, 450

[56] References Cited

U.S. PATENT DOCUMENTS

| 4,386,174 | 5/1983 | Cogswell et al. | 525/425 |
| 4,438,236 | 3/1984 | Cogswell et al. | 525/425 |
| 4,745,160 | 5/1988 | Churchill et al. | 525/411 |
| 4,916,193 | 4/1990 | Tang et al. | 525/411 |
| 5,019,096 | 5/1991 | Fox, Jr. et al. | 523/122 |

*Primary Examiner*—Paul R. Michl
*Assistant Examiner*—Andrew E. C. Merriam
*Attorney, Agent, or Firm*—Lorusso & Loud

[57] ABSTRACT

A biodegradable plastic composition is disclosed which includes a polycaprolactone and a poly-$\beta$-hydroxybutyrate. Disclosed also is a biodegradable plastic shaped body formed of such a composition. The shaped body may be produced by melt-mixing a blend of a polycaprolactone, a poly-$\beta$-hydroxybutyrate and a copolymerization catalyst to copolymerize a portion of the polycaprolactone with a portion of the poly-$\beta$-hydroxybutyrate, thereby to obtain a caprolactone/$\beta$-hydroxybutyric acid copolymer-containing melt, which is subsequently shaped into a desired form.

8 Claims, No Drawings

BIODEGRADABLE PLASTIC COMPOSITION, BIODEGRADABLE PLASTIC SHAPED BODY AND METHOD OF PRODUCING SAME

This invention relates to a biodegradable plastic composition, a shaped body formed of such a composition and a method of producing such a shaped body.

Shaped bodies formed of plastic materials containing biodegradable starch have been hitherto proposed as a countermeasure for solving a problem of increase of plastic wastes. Such shaped bodies may be disintegrated when subjected to waste disposal due to degradation of the starch contained therein by microorganism. In this case, however, the plastic materials of the disintegrated body still remain undecomposed so that problems of environmental pollution are not completely solved.

The present invention has been made with the foregoing problems of the conventional biodisintegrable shaped body in view.

In accordance with one aspect of the present invention, there is provided a biodegradable plastic composition comprising a polycaprolactone and a poly-$\beta$-hydroxybutyrate.

In another aspect, the present invention provides a shaped body formed of a mixture containing a polycaprolactone and a poly-$\beta$-hydroxybutyrate.

In a further aspect, the present invention provides a process of producing a shaped body formed of a biodegradable plastic material, comprising the steps of:

providing a blend of a polycaprolactone, a poly-$\beta$-hydroxybutyrate and a copolymerization catalyst effective to copolymerizing said polycaprolactone with said poly-$\beta$-hydroxybutyrate;

mixing said blend at a temperature and for a period of time sufficient to melt said polycaprolactone and said poly-$\beta$-hydroxybutyrate and to copolymerize a portion of said polycaprolactone with a portion of said poly-$\beta$-hydroxybutyrate, thereby to obtain a caprolactone/$\beta$-hydroxybutyric acid copolymer-containing melt; and shaping said melt into a desired form.

Polycaprolactones (hereinafter referred to as PCL for brevity) used in the present invention have biodegradability. The melting point of PCL is, however, so low that they are impractical for wide industrial utilization. Poly-$\beta$-hydroxybutyrates (hereinafter referred to as PHB for brevity) are also biodegradable. While PHB has a high melting point, it is so highly crystalline and brittle that it finds no practical industrial utilities. In the present invention, PCL and PHB are used as a mixture. Shaped bodies formed of such a mixture are biodegradable in nature and exhibit satisfactory physical properties.

The present invention will now be described in detail below with regard to a shaped body and process for the production thereof.

Biodegradable plastic shaped body according to the present invention is formed of a mixture containing PCL and PHB.

PCL to be used in the present invention generally has a number average molecular weight of 1,000–120,000, preferably 10,000–100,000 while PHB generally has a number average molecular weight of 10,000–1,000,000, preferably 20,000–200,000. The weight ratio of PCL to PHB is generally 9:1 to 2:8, preferably 8:2–3:7.

It is preferred that the mixture of PCL with PHB further contain a copolymer of caprolactone and $\beta$-hydroxybutyric acid since the compatibility of PCL with PHB is improved without adversely affecting the biodegradability of the mixture. The copolymer preferably has a melting point of 80°–160° C. and a molar ratio of the caprolactone monomer unit to the $\beta$-hydroxybutyric acid monomer unit of 2:8–8:2, more preferably 4:6–6:4. Both random and block copolymer may be suitably used. The copolymer, which has also a good biodegradability, is generally used in an amount of 5–30% by weight, preferably 10–25% by weight based on the weight of the mixture, i.e. based on the total weight of PCL, PHB and the copolymer. An amount of the copolymer below 5% by weight is insufficient to obtain significant compatibility-improving effect. Too large an amount of the copolymer in excess of 30% by weight does not provide any additional merits. Rather, such a large amount of the copolymer results in the presence of a relatively large amount of the catalyst, which has been used in the production thereof, in the mixture and, therefore, adversely affects moldability of the mixture.

The copolymer may be obtained by copolymerizing PCL with PHB at an elevated temperature in the presence of a catalytically effective amount of a catalyst. Any catalyst may be used as long as it can catalyze transesterification (ester exchange) between PCL and PHB. Illustrative of suitable catalysts are zinc acetic anhydride and zinc stearate. The catalyst is generally used in an amount of 0.05–5% by weight, preferably 0.1–1% by weight based on the total amount of PCL and PHB. The copolymerization is preferably performed at a temperature sufficient to melt PCL and PHB.

Thus, the biodegradable shaped body formed of a mixture containing PCL, PHB and a caprolactone/$\beta$-hydroxybutyric acid copolymer may be suitably obtained by a method including a step of mixing a blend of PCL, PHB and the above catalyst at a temperature and for a period of time sufficient to melt PCL and PHB and to copolymerize a portion of PCL with a portion of PHB, thereby to obtain a melt containing unreacted PCL, unreacted PHB and the caprolactone/$\beta$-hydroxybutyric acid copolymer formed in situ, and a step of shaping the melt into a desired form. Such mixing, copolymerizing and shaping operations may be suitably effected using an extruder. Namely, the blend is charged into the extruder and is melt-kneaded therewithin until a predetermined quantity of a caprolactone/$\beta$-hydroxybutyric acid copolymer has been formed. The kneaded melt is then extruded through a die into a low pressure zone to form an extrusion molded body.

The biodegradable shaped body formed of PCL, PHB and a copolymer of caprolactone with $\beta$-hydroxybutyric acid may also be prepared by a method including a step of mixing a blend of PCL, PHB and the copolymer at a temperature sufficient to melt PCL, PHB and the copolymer, thereby to obtain a melt containing PCL, PHB and the caprolactone/$\beta$-hydroxybutyric acid copolymer, and a step of shaping the melt into a desired form.

The shaped bodies according to the present invention may contain various additives such as an inorganic filler, a pigment and an antioxidant. The shaped bodies may be in various forms such as pellets, powders, particles, films, sheets, nets, threads and plates. A suitable molding method such as extrusion molding, injection molding or calendar molding is to be adopted according to the desired form of the shaped body. The shaped bodies containing a copolymer of caprolactone and β-hydroxybutyric acid have improved mechanical properties such as elongation or thermoformability so that they may be advantageously used as raw materials for the production of composite articles and molded articles. For example, films of the present invention may be used for fabricating laminated sheets, cushioning materials or the like composite articles and pellets of the present invention may be used for the fabrication of containers or the like molded articles. In particular, shaped bodies in the form of films, sheets or plates (inclusive of composite or laminated materials) may be used as bags, containers, trays, bowls, boxes, frames and bottoms thereof and cushioning materials.

According to the end use, the shaped bodies of the present invention may be made in an expanded or foamed form. Expansion may be performed in any known manner during or after the production of the shaped bodies. In a preferred embodiment according to the present invention, expanded, shaped bodies may be obtained by a method including the steps of providing unexpanded particles or pellets formed of the above-described biodegradable plastic composition, rendering the particles or pellets expandable by any known manner, and heat-treating the expandable particles or pellets within a mold to obtain an expanded article with a desired shape.

The following example will further illustrate the present invention.

EXAMPLE

A polycaprolactone (melting point: 60° C., number average molecular weight: 70,000), a poly-β-hydroxybutyrate (melting point: 180° C., number average molecular weight: 100,000) and a catalyst (zinc acetic anhydride) were charged in an extruder (screw diameter: 40 mm, L/D: 25) in the proportion shown in Table 1 and melt-kneaded therewithin. The melt was then extruded at 200° C. through a T-die mounted on the tip of the extruder to form a film having a thickness of 100 μm. The film was tested for its copolymer content, elongation and biodegradability to give the results summarized in Table 1. The test methods are as follows:

COPOLYMER CONTENT:

The content (% by weight) of the caprolactone/β-hydroxybutyric acid copolymer contained in the film was determined by the DSC method (heating rate: 10° C./minute).

ELONGATION

The film was cut into a strip having a length (extrusion direction) of 100 mm and a width (tranverse direction) of 10 mm. The strip was set to a tensile strength testing machine with a distance between chucks of 50 mm and drawn at a rate of 50 mm/minute and a temperature of 25° C. The length (L mm) of the strip at the time it was broken was measured. The elongation (%) was calculated as follows:

Elongation (%) = (L-100) × 100/100

BIODEGRADABILITY

The film (200 mg) was placed in a 100 ml Erlenmeyer flask containing 0.3 ml of a lipase solution capable of producing 130 μmol of fatty acids in one minute from olive oil, 2 ml of a phosphate buffer (pH 7), 1 ml of a surfactant (PLYSURF A210G, manufactured by Daiichi Kogyo Seiyaku K. K.) and 16.7 ml of water. The mixture in the flask was reacted at 30° C. for 16 hours. The amount of the water-soluble organic substances (monomer and oligomers of caprolactone) produced as a result of the reaction was then measured using a total organic carbon analyzer.

TABLE 1

| Experiment No. | Amount (parts by weight) | | | Copolymer Content (wt. %) | Elongation (%) | Biodegradability (ppm) |
|---|---|---|---|---|---|---|
| | PCL | PHB | Catalyst | | | |
| 1 | 50 | 50 | 0 | 0 | 50 | 450 |
| 2 | 50 | 50 | 0.1 | 2 | 100 | 400 |
| 3 | 50 | 50 | 0.5 | 15 | 350 | 400 |
| 4 | 50 | 50 | 1.0 | 28 | 400 | 400 |
| 5 | 50 | 50 | 3.0 | 32 | 400 | 400 |

From the results shown in Table 1, it will be appreciated that the plastic film according to the present invention exhibits good biodegradability. Further, the incorporation of the caprolactone/β-hydroxybutyric acid copolymer significantly improves the elongation of the film without adversely affecting the biodegradability.

We claim:

1. A biodegradable plastic composition comprising at least 70% by weight of a blend of a polycaprolactone and a poly-β-hydroxybutyrate and 5-30% by weight of a copolymer of caprolactone and β-hydroxybutyric acid, based on the total weight of said polycaprolactone, said poly-β-hydroxybutyric acid and said copolymer.

2. The composition as claimed in claim 1, wherein said polycaprolactone and poly-β-hydroxybutyrate have number average molecular weights of 1,000-120,000 and 10,000-1,000,000, respectively.

3. The composition as claimed in claim 1, wherein the weight ratio of said polycaprolactone to said poly-β-hydroxybutyrate is 9:1 to 2:8.

4. The composition as claimed in claim 1, wherein said copolymer has a molar ratio of caprolactone to β-hydroxybutyric acid of 2:8 to 8:2.

5. The composition as claimed in claim 1, wherein said copolymer has a melting point of 80°-160° C.

6. A biodegradable plastic shaped body formed of a mixture containing a copolymer of caprolactone and β-hydroxybutyric acid and at least 70% by weight of a blend of a polycaprolactone and a poly-β-hydroxybutyrate.

7. A method of producing a shaped body formed of a biodegradable plastic material, comprising the steps of:
providing a blend of a polycaprolactone, a poly-β-hydroxybutyrate and a copolymerization catalyst effective to compolymerize said polycaprolactone with said poly-β-hydroxybutyrate;
mixing said blend at a temperature and for a period of time sufficient to melt said polycaprolactone and said poly-β-hydroxybutyrate and to copolymerize a portion of said polycaprolactone with a portion of said poly-β-hydroxybutyrate, thereby to obtain 5-30 wt. % of a caprolactone/β-hydroxybutyric acid copolymer in a melt in admixture with the remaining polycaprolactone and poly-β-hydroxybutyrate; and
shaping said melt into a desired form.

8. The method as claimed in claim 7, wherein said mixing and shaping steps are effected with an extruder.

* * * * *